United States Patent
Wu et al.

(10) Patent No.: US 11,954,912 B2
(45) Date of Patent: Apr. 9, 2024

(54) METHOD FOR CUTTING VIDEO BASED ON TEXT OF THE VIDEO AND COMPUTING DEVICE APPLYING METHOD

(71) Applicant: Ping An Technology (Shenzhen) Co., Ltd., Shenzhen (CN)

(72) Inventors: Xinyi Wu, Bethesda, MD (US); Yiwei Wang, Bethesda, MD (US); Tian Xia, Bethesda, MD (US); Peng Chang, Bethesda, MD (US); Mei Han, Bethesda, MD (US); Jing Xiao, Bethesda, MD (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 483 days.

(21) Appl. No.: 17/238,832

(22) Filed: Apr. 23, 2021

(65) Prior Publication Data

US 2022/0343100 A1 Oct. 27, 2022

(51) Int. Cl.
| | |
|---|---|
| G06V 20/40 | (2022.01) |
| G06F 40/279 | (2020.01) |
| G06F 40/30 | (2020.01) |
| G06T 7/00 | (2017.01) |
| G06V 10/40 | (2022.01) |
| G06V 30/262 | (2022.01) |
| G10L 15/08 | (2006.01) |

(Continued)

(52) U.S. Cl.
CPC ............ *G06V 20/49* (2022.01); *G06F 40/279* (2020.01); *G06F 40/30* (2020.01); *G06T 7/0002* (2013.01); *G06V 10/40* (2022.01); *G06V 30/274* (2022.01); *G10L 15/26* (2013.01); *G10L 21/10* (2013.01); *G06T 2207/10016* (2013.01); *G06T 2207/30168* (2013.01); *G06V 30/10* (2022.01)

(58) Field of Classification Search
USPC ........ 382/103–305; 386/278–290; 706/1–62, 706/900–903; 704/1–275
See application file for complete search history.

(56) References Cited

U.S. PATENT DOCUMENTS

| | | | |
|---|---|---|---|
| 2022/0130427 A1* | 4/2022 | Allibhai | G10L 21/10 |
| 2022/0301579 A1* | 9/2022 | Cao | G10L 15/26 |

OTHER PUBLICATIONS

Liu, Xiang; Information Extraction Method Based on AI Technology, Device and Storage Medium; Mar. 26, 2021 (Year: 2021).*

(Continued)

*Primary Examiner* — Marcellus J Augustin
(74) *Attorney, Agent, or Firm* — ScienBiziP, P.C.

(57) ABSTRACT

A method for cutting or extracting video clips from a video, including the audio content relevant to points of particular interest, and combining the same for instruction or training on particular points; a computing device applying the method extracts text information from the spoken audio content of a video to be cut and obtains multiple paragraph segmentation positions as candidates for inclusion in a desired and finished presentation by analyzing the information from text representing the spoken audio content, the analysis being carried out by a semantic segmentation model. Candidate items of text are obtained by isolating pieces of text according to the paragraph segmentation positions. Time stamps of the candidate text segments are acquired, and candidate video clips are obtained by cutting the video according to the acquired time stamps.

20 Claims, 3 Drawing Sheets

(51) Int. Cl.
G10L 15/26 (2006.01)
G10L 21/10 (2013.01)
G06V 30/10 (2022.01)

(56) References Cited

OTHER PUBLICATIONS

Wang Jingwen; Video Clip Positioning Method and Device, Computer Equipment and Storage Medium; Oct. 30, 2020 (Year: 2020).*

* cited by examiner

METHOD FOR CUTTING VIDEO BASED ON TEXT OF THE VIDEO AND COMPUTING DEVICE APPLYING METHOD

FIELD

The present disclosure relates to a technical field of data processing technology, specifically a method for cutting video based on text of the video and a computing device using thereof.

BACKGROUND

After a video is cut into several small segments, each segment can be called a video clip. Content of each segment is relatively independent and complete. Demand for video clips is increasing, a segment of the video can be output as a short video alone, or as a material for subsequent processing.

Traditional method for cutting a video requires an editing staff to have certain professional knowledge. After watching the video, final required segments are selected based on the video content, and the video is cut by editing software, which is time-consuming and laborious. Most smart video editing software in the industry is based on recognizing video content through image analysis. In a video of an academic course, the images of the video are mainly to show the person facing the camera giving a lecture, with few changes, and does not contain course content information. It is difficult to create a useful and worthwhile course video where the video content of the course is based only on image analysis.

SUMMARY

A first aspect of an embodiment of the present disclosure provides a. The method includes: obtaining a video to be cut; extracting text information from the video to be cut; obtaining a plurality of candidate paragraph segmentation positions by analyzing the text information through a semantic segmentation model; obtaining a plurality of candidate text segments by segmenting the text information according to the candidate paragraph segmentation positions; acquiring a plurality of time stamps of the plurality of candidate text segments; obtaining a plurality of candidate video clips by cutting the video according to the acquired time stamps; obtaining a plurality of target video clips by filtering the plurality of candidate video clips according to preset content; and outputting the plurality of target video clips.

A second aspect of an embodiment of the present disclosure provides a computing device, which includes at least one processor and a storage device storing one or more programs which when executed by the at least one processor, causes the at least one processor to obtain a video to be cut; extract text information from the video to be cut; obtain a plurality of candidate paragraph segmentation positions by analyzing the text information through a semantic segmentation model; obtain a plurality of candidate text segments by segmenting the text information according to the candidate paragraph segmentation positions; acquire a plurality of time stamps of the plurality of candidate text segments; obtain a plurality of candidate video clips by cutting the video according to the acquired time stamps; obtain a plurality of target video clips by filtering the plurality of candidate video clips according to preset content; and outputting the plurality of target video clips.

A third aspect of an embodiment of the present disclosure provides a non-transitory storage medium having stored thereon instructions that, when executed by a processor of a computing device, causes the computing device to perform a method for cutting video. The method includes obtaining a video to be cut; extracting text information corresponding to the video to be cut; obtaining a plurality of candidate paragraph segmentation positions by analyzing the text information through a semantic segmentation model; obtaining a plurality of candidate text segments by segmenting the text information according to the candidate paragraph segmentation positions; acquiring a plurality of time stamps of the plurality of candidate text segments; obtaining a plurality of candidate video clips by cutting the video according to the acquired time stamps; obtaining a plurality of target video clips by filtering the plurality of candidate video clips according to desired preset content; and outputting the plurality of target video clips.

In the embodiments of the present disclosure, by extracting text information corresponding to a video to be cut; and obtaining a plurality of candidate paragraph segmentation positions by analyzing the text information through a semantic segmentation model. A plurality of candidate text segments are obtained by segmenting the text information according to the candidate paragraph segmentation positions, and a plurality of time stamps of the plurality of candidate text segments are acquired, and a plurality of candidate video clips by cutting the video according to the acquired time stamps are obtained. The method can make the video cutting work automation, especially for the course explanation or training video, can greatly improve the efficiency of video cutting.

DETAILED DESCRIPTION

The embodiments of the present disclosure are described with reference to the accompanying drawings. Described embodiments are merely embodiments which are a part of the present disclosure, and do not include every embodiment. All other embodiments obtained by those of ordinary skill in the art based on the embodiments of the present disclosure without creative efforts are within the scope of the claims.

Terms such as "first", "second" and the like in the specification and in the claims of the present disclosure and the above drawings are used to distinguish different objects, and are not intended to describe a specific order. Moreover, the term "include" and any variations of the term are intended to indicate a non-exclusive inclusion. For example, a process, a method, a system, a product, or a device which includes a series of steps or units is not limited to steps or units which are listed, but can include steps or units which are not listed, or can include other steps or units inherent to such processes, methods, products, and equipment.

Figure 1:
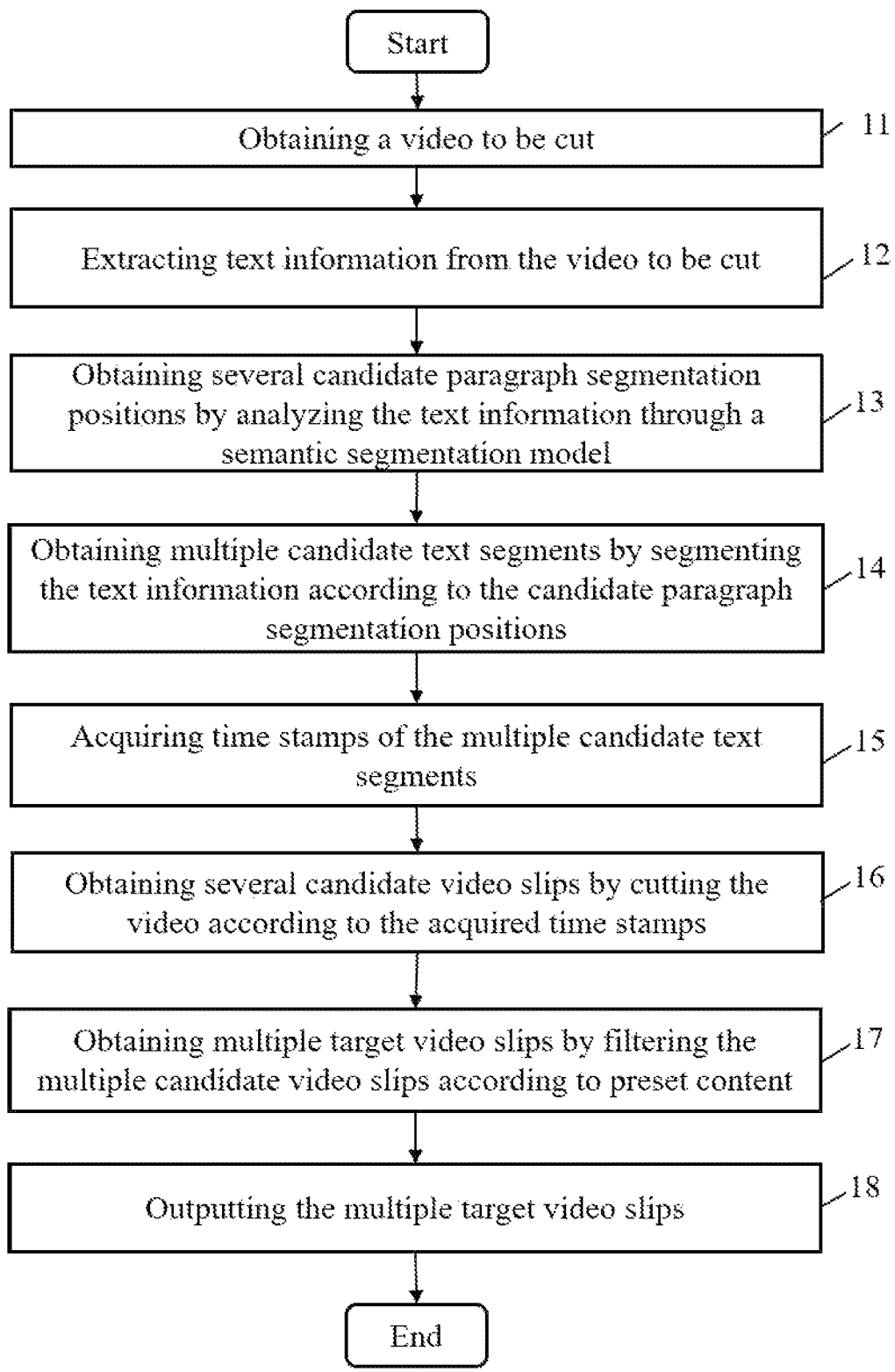
FIG. 1 shows a schematic flow chart of an embodiment of a method for cutting video based on text of the video according to the present disclosure.

FIG. 1 shows a schematic flow chart of an embodiment of a method for cutting video based on text of the video according to the present disclosure.

As shown in FIG. 1, the method for cutting video applicable in a computing device (e.g., the computing device 100) can include the following steps. According to different requirements, the order of the steps in the flow chart may be changed, and some steps may be omitted.

In block 11, obtaining a video to be cut.

In some embodiments, the video to be cut may be a video of a training course or other video. Images of the course video include a person facing a camera teaching course content. The image of each frame of the video is less changed, and the course content information of the image is less. It is difficult to determine important or core moments or segments in the course by reference to images of the course. The method for cutting video can determine the important or core moments or segments of the course video by analyzing text corresponding to the course video, and then extract the important or core moments or segments from the course video.

In at least one embodiment, a source of the video to be cut includes, but is not limited to, downloaded files, stored videos, and recorded video streams (for example, live video streaming, http video streaming), etc.

In block 12, extracting text information from the video to be cut.

In at least one embodiment, the computing device acquires audio information of the video to be cut, and extracts subtitles corresponding to the audio information by speech-to-text technology, and generates the text information according to the subtitles.

It should be noted that the generated text information is one single paragraph, and the text information includes some sentence segmentation positions and time stamps. Every two sentence segmentation positions corresponds to two time stamps. For example, a sentence of the text information can include two sentence segmentation positions, and the two sentence segmentation positions includes a start sentence segmentation position, and an end sentence segmentation position. The start sentence segmentation position represents a start of the sentence, and the end sentence segmentation position represents an end of the sentence. The start sentence segmentation position corresponds to a first time stamp, and the end sentence segmentation position corresponds to a second time stamp. The computing device can identify a video segment according to the first time stamp and the second time stamp, and determine that the sentence is the subtitle or the words which are spoken (and recorded) of the video segment.

In at least one embodiment, the sentence segmentation positions can be understood as punctuation marks. For example, the text information corresponding to the video content to be cut can be a whole paragraph of text including punctuation marks. In addition, the time stamps of the text information need to be recorded for the purpose of cutting the video.

In at least one embodiment, the computing device identifies speaker breakpoints corresponding to the audio information according to time intervals of the person speaking, and determines the sentence segmentation positions of the text information according to the breakpoints. For example, the computing device determines the breakpoints according to waveforms of the audio information. For example, if an amplitude corresponding to the waveform of the audio information is zero or lower than a preset value, it is determined that a point corresponding to the waveform is a breakpoint.

In order to achieve an accuracy of cutting the video, the pause time interval and the time interval of each speech segment can be set for accurate cutting. There are different speeds of human voice, for example, ordinary speech speed, fast speech speed, and slow speech speed. In order to further achieve accurate sentence segmentation, the pause time interval and the time interval of each speech segment can be set respectively according to the speed of human voice in the audio.

In block 13, obtaining several candidate paragraph segmentation positions by analyzing the text information through a semantic segmentation model.

In at least one embodiment, the semantic segmentation model includes a local semantic segmentation model and a global semantic segmentation model.

In one embodiment, a method for obtaining the candidate paragraph segmentation positions by analyzing the text information through the local semantic segmentation model includes:

(A1) Encoding a context of each sentence segmentation position of the text information through an embedding layer of the local semantic segmentation model;

(B1) Performing feature extraction on the encoded text information through a pre-trained language model;

(C1) Classifying each sentence segmentation position according to the extracted features by a classifier mechanism, and calculating a first probability of each sentence segmentation position;

(D1) Determining whether the first probability is greater than or equal to a first preset probability; if the first probability is greater than or equal to the first preset probability, determining that the sentence segmentation position is a candidate paragraph segmentation position but if the first probability is less than the first preset probability, determining that the sentence segmentation position is not a candidate paragraph segmentation position.

In one embodiment, a method for obtaining the candidate paragraph segmentation positions by analyzing the text information through the global semantic segmentation model includes:

(A2) dividing the text information into a first text block sequence and a second text block sequence. The first text block sequence is a sequence obtained by forward segmentation from the beginning of the text information. The second text block sequence is a sequence obtained by reverse segmentation from the end of the text information. In this embodiment, the first text block sequence is segmented going forward from the beginning of the text, and the second text block sequence is segmented going backwards from the end of the text, so that each candidate paragraph segmentation position obtained according to the sentence segmentation positions can be associated with the previous and with the following information of the sentence segmentation position.

(B2) encoding a context of each sentence segmentation position of the first text block sequence and the second text block sequence through an embedding layer of the global semantic segmentation model;

(C2) obtaining a first feature by performing feature extraction on the encoded first text block sequence through the pre-trained language model, and obtaining a second feature by performing feature extraction on the encoded second text block sequence through the pre-trained language model;

(D2) classifying each sentence segmentation position according to the extracted first feature and the second feature by the classifier, and calculating a second probability of each sentence segmentation position. In this embodiment, each sentence segmentation position combines forward and reverse features (such as the first feature and the second feature) of the text information. Each sentence segmentation position is classified by the classifier to determine whether it is a candidate paragraph segmentation position.

(E2) determining whether the second probability is greater than or equal to the preset probability; if the second probability is greater than or equal to a second preset probability, determining that the sentence segmentation position is a candidate paragraph segmentation position but if the second probability is less than the second preset probability, determining that the sentence segmentation position is not a candidate paragraph segmentation position.

In practical applications, advantages of the local semantic segmentation model and the global semantic segmentation model can be combined with the characteristics of the text information of the video, to fuse the first and second probabilities for outputting the final candidate paragraph segmentation position.

In block 14, obtaining multiple candidate text segments by segmenting the text information according to the candidate paragraph segmentation positions.

In at least one embodiment, the computing device can obtain multiple candidate text segments by segmenting the whole paragraph of the text information according to the candidate paragraph segmentation positions.

In block 15, acquiring time stamps of the multiple candidate text segments.

In at least one embodiment, the computing device can select the time stamps of the multiple candidate text segments from the time stamps of the text information. For example, when the whole text information includes ten sentences, each sentence includes two time stamps. That is to say, the whole text information includes twenty time stamps. The twenty time stamps can generate a sequence of data that is time-related. For example, the first sentence includes a first and a second time stamps, the second sentence includes a third and fourth time stamps . . . and the tenth sentence includes nineteenth and twentieth time stamps. If the computing device obtains two candidate paragraph segmentation positions, and one candidate paragraph segmentation position is corresponding an end sentence segmentation position of the second sentence, the other candidate paragraph segmentation position is corresponding an end sentence segmentation position of the eighteenth sentence. Thus, the computing device can acquire the third and the fourth time stamp and the fifteenth and sixteenth time stamp.

It should be noted that an end sentence segmentation position of a previous sentence of the text comes immediately or sequentially before the start sentence segmentation position of a following sentence. For example, an end sentence segmentation position of a first sentence of the text is a start sentence segmentation position of the second sentence. A time stamp of a previous sentence of the text is a time stamp of sentence after the previous sentence. For example, the second time stamp is the third time stamp, and the fourth time stamp is the fifth time stamp, and so on.

In block 16, obtaining several candidate video clips by cutting the video according to the acquired time stamps.

For example, the text information is segmented by the candidate paragraph segmentation positions to obtain a first candidate text segment, a second candidate text segment, and a third candidate text segment. A start time and an end time of the first candidate text segment can be obtained according to the time stamp of the first candidate text segment, and the video is cut according to the start time and end time to obtain the first candidate video clip. In the same way, the second candidate video clip corresponding to the second candidate text segment and the third candidate video clip corresponding to the third candidate text segment can be obtained.

In block 17, obtaining multiple target video clips by filtering the multiple candidate video clips according to preset content.

In at least one embodiment, the multiple candidate video clips can be filtered according to the preset content of the course video. The preset content of the course video can include items of information as knowledge or mentions of particular points of interest ("course knowledge points"). Only video clips whose content matches with the course knowledge points are retained to obtain multiple target video clips.

For example, the video to be cut may contain a lot of content that the target person indicates or states has nothing to do with course knowledge points. After segmenting the video to be cut, the multiple candidate video clips that are not related to the course knowledge points are deleted, and only relevant video clips are retained.

A method for obtaining multiple target video clips by filtering the multiple candidate video clips according to preset content includes: obtaining each candidate text segment corresponding to each candidate video clip; calculating a similarity between the candidate text segment and the preset content; If the similarity is greater than or equal to a preset value, determining that the candidate video clip corresponding to the candidate text segment is a target video clip; if the similarity is less than the preset value, deleting the candidate video clip.

In block 18, outputting the multiple target video clips.

In at least one embodiment, the method further includes: determining quality of each of the multiple target video clips according to several predetermined parameters, and the predetermined parameters include a position of the target person in the images of the multiple target video clips, a period of time during which the target person appears in the multiple target video clips, camera movement or shake, and brightness of the images of the multiple target video clips; obtaining high-quality target video clips according to the quality and outputting the high-quality target video clips.

In at least one embodiment, a method for determining quality of each of the multiple target video clips according to predetermined parameters includes: establishing a classifier mechanism based on the predetermined parameters; filtering out low-quality target video slices among the multiple target video slices through the classifier to obtain high-quality target video clips. It should be noted that the classifier can classify videos into the two categories of high quality and low quality based on the predetermined parameters. The method for establishing the classifier mechanism based on the predetermined parameters is an existing technology, and will not be repeated here.

In at least one embodiment, if a position of the target person of the image of the target video clip is not a center of the image, the quality of the target video clip is confirmed to be high; if his or her position is the center of the image, the quality of the target video clip is deemed to be low. If the time period of the target person appearing in the multiple target video clips is greater than or equal to a predetermined time period, the quality of the target video clip is deemed to be high; if the time period of the target person appearing in the multiple target video clips is less than the predetermined time period, the quality of the target video clip is deemed to be low. If there is no camera shake in the target video clip, the quality of the target video clip is confirmed to be high; if there is camera shake in the target video clip, the quality of the target video clip is confirmed to be low. If the overall brightness of the target video clip is high, the quality of the target video clip is confirmed to be high; if the display brightness of the target video clip is low, the quality of the target video clip is confirmed to be low.

In at least one embodiment, a method for determining the position of the target person of the image of the target video clip includes: detecting feature points of a face of the target person of the image of the target video clip by a key point detection algorithm, and calculating distances between the feature points and edges of the image of the target video clip, and determining the position of the target person in the image based on the distances.

In at least one embodiment, a method for calculating the time period of the target person appearing in the multiple target video clips includes: detecting feature points of a face of the target person of the image of the target video clip by a key point detection algorithm, and recording a time period of the feature points appearing in the multiple target video clip, and setting the time period of the feature points appearing in the multiple target video clip as equal to the time period of the target person himself appearing in the multiple target video clip.

In at least one embodiment, a method for determining whether there is camera shake of the target video clip includes: detecting multiple feature points in a first frame of the target video clip by an image corner fast detection algorithm; recording a plurality of first positions of the plurality of feature points in the first frame; recording a plurality of second positions of the multiple feature points in a second frame of the target video clip; determining whether the plurality of first positions are the same as the plurality of second positions; if a ratio of correspondence between the first position and the second position is greater than or equal to a preset ratio, the camera shake is determined to exist; if the ratio is less, the camera shake is determined to be absent. If positions of the points are tracked, and a large proportion of the points change, this indicates the camera shake.

In at least one embodiment, a method for determining the brightness of images of the target video clip includes: detecting multiple feature points in a first frame of the target video clip by an image corner fast detection algorithm; estimating a face region, a shoulder region, and a background region based on the multiple feature points; average processing of the brightness of the face area, shoulder area, and background area; if the average processed brightness is greater than or equal to a preset brightness, the brightness of the image of the target video clip is determined to be high and acceptable; if the average processed brightness is less than the preset brightness, the brightness of the image of the target video clip is determined to be low and unacceptable.

Figure 2:
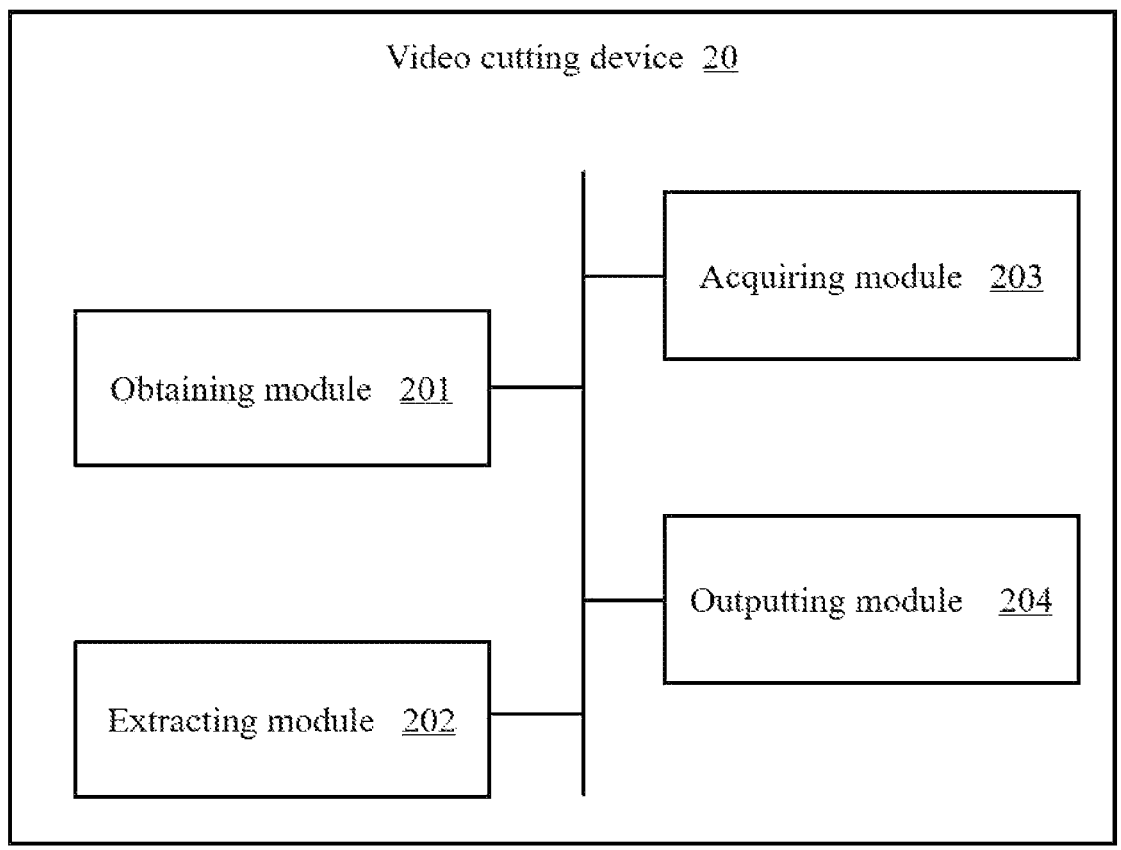
FIG. 2 shows a schematic structural diagram of an embodiment of a video cutting device according to the present disclosure.

FIG. 2 shows a schematic structural diagram of an embodiment of a cutting video device according to the present disclosure.

In some embodiments, the video cutting device 20 can include a plurality of function modules consisting of program code segments. The program code of each program code segments in the device for the video cutting device 20 may be stored in a memory of a computing device and executed by the at least one processor to perform (described in detail in FIG. 1) a function of cutting video.

In an embodiment, the video cutting device 20 can be divided into a plurality of functional modules, according to the performed functions. The functional module can include: a obtaining module 201, an extracting module 202, an acquiring module 203, and an outputting module 204. A module as referred to in the present disclosure refers to a series of computer program segments that can be executed by at least one processor and that are capable of performing fixed functions, which are stored in a memory. In this embodiment, the functions of each module will be detailed in the following embodiments.

The obtaining module 201 obtains a video to be cut.

In some embodiments, the video to be cut may be a video of a training course or other video. Images of the course video include a person facing a camera teaching course content. The image of each frame of the video is less changed, and the course content information of the image is less. It is difficult to determine important or core moments or segments in the course by reference to images of the course. The method for cutting video can determine the important or core moments or segments of the course video by analyzing text corresponding to the course video, and then extract the important or core moments or segments from the course video.

In at least one embodiment, a source of the video to be cut includes, but is not limited to, downloaded files, stored videos, and recorded video streams (for example, live video streaming, http video streaming), etc.

The extracting module 202 extracts text information from the video to be cut.

In at least one embodiment, the extracting module 201 acquires audio information of the video to be cut, and extracts subtitles corresponding to the audio information by speech-to-text technology, and generates the text information according to the subtitles.

It should be noted that the generated text information is one single paragraph, and the text information includes some sentence segmentation positions and time stamps. Every two sentence segmentation positions corresponds to two time stamps. For example, a sentence of the text information can include two sentence segmentation positions, and the two sentence segmentation positions includes a start sentence segmentation position, and an end sentence segmentation position. The start sentence segmentation position represents a start of the sentence, and the end sentence segmentation position represents an end of the sentence. The start sentence segmentation position corresponds to a first time stamp, and the end sentence segmentation position corresponds to a second time stamp. The computing device can identify a video segment according to the first time stamp and the second time stamp, and determine that the sentence is the subtitle or the words which are spoken (and recorded) of the video segment.

In at least one embodiment, the sentence segmentation positions can be understood as punctuation marks. For example, the text information corresponding to the video content to be cut can be a whole paragraph of text including punctuation marks. In addition, the time stamps of the text information need to be recorded for the purpose of cutting the video.

In at least one embodiment, the computing device iden- tifies speaker breakpoints corresponding to the audio information according to time intervals of the person speaking, and determines the sentence segmentation positions of the text information according to the breakpoints. For example, the computing device determines the breakpoints according to waveforms of the audio information. For example, if an amplitude corresponding to the waveform of the audio information is zero or lower than a preset value, it is determined that a point corresponding to the waveform is a breakpoint.

In order to achieve an accuracy of cutting the video, the pause time interval and the time interval of each speech segment can be set for accurate cutting. There are different speeds of human voice, for example, ordinary speech speed, fast speech speed, and slow speech speed. In order to further achieve accurate sentence segmentation, the pause time interval and the time interval of each speech segment can be set respectively according to the speed of human voice in the audio.

The obtaining module 201 obtains several candidate paragraph segmentation positions by analyzing the text information through a semantic segmentation model.

In at least one embodiment, the semantic segmentation model includes a local semantic segmentation model and a global semantic segmentation model.

In one embodiment, a method for obtaining the candidate paragraph segmentation positions by analyzing the text information through local semantic segmentation model includes:

(A1) Encoding a context of each sentence segmentation position of the text information through a embedding layer of the local semantic segmentation model;

(B1) Performing feature extraction on the encoded text information through a pre-trained language model;

(C1) Classifying each sentence segmentation position according to the extracted features by a classifier mechanism, and calculate a first probability of each sentence segmentation position;

(D1) Determining whether the first probability is greater than or equal to a first preset probability; if the first probability is greater than or equal to the first preset probability, determining that the sentence segmentation position is a candidate paragraph segmentation position but if the first probability is less than the first preset probability, determining that the sentence segmentation position is not a candidate paragraph segmentation position.

In one embodiment, a method for obtaining the candidate paragraph segmentation positions by analyzing the text information through the global semantic segmentation model includes:

(A2) dividing the text information into a first text block sequence and a second text block sequence. The first text block sequence is a sequence obtained by forward segmentation from the beginning of the text information. The second text block sequence is a sequence obtained by reverse segmentation from the end of the text information. In this embodiment, the first text block sequence is segmented going forward from the beginning of the text, and the second text block sequence is segmented going backwards from the end of the text, so that each candidate paragraph segmentation position obtained according to the sentence segmentation positions can be associated with the previous and with the following information of the sentence segmentation position.

(B2) encoding a context of each sentence segmentation position of the first text block sequence and the second text block sequence through an embedding layer of the global semantic segmentation model;

(C2) obtaining a first feature by performing feature extraction on the encoded first text block sequence through the pre-trained language model, and obtaining a second feature by performing feature extraction on the encoded second text block sequence through the pre-trained language model;

(D2) classifying each sentence segmentation position according to the extracted first feature and the second feature by the classifier, and calculating a second probability of each sentence segmentation position. In this embodiment, each sentence segmentation position combines forward and reverse features (such as the first feature and the second feature) of the text information. Each sentence segmentation position is classified by the classifier to determine whether it is a candidate paragraph segmentation position.

(E2) determining whether the second probability is greater than or equal to the preset probability; if the second probability is greater than or equal to a second preset probability, determining that the sentence segmentation position is a candidate paragraph segmentation position but if the second probability is less than the second preset probability, determining that the sentence segmentation position is not a candidate paragraph segmentation position.

In practical applications, advantages of the local semantic segmentation model and the global semantic segmentation model can be combined with the characteristics of the text information of the video, to fuse the first and second probabilities for outputting the final candidate paragraph segmentation position.

The obtaining module 201 obtains multiple candidate text segments by segmenting the text information according to the candidate paragraph segmentation positions.

In at least one embodiment, the obtaining module 201 obtains multiple candidate text segments by segmenting the whole paragraph of the text information according to the candidate paragraph segmentation positions.

The acquiring module 203 acquires time stamps of the multiple candidate text segments.

In at least one embodiment, the acquiring module 203 can select the time stamps of the multiple candidate text segments from the time stamps of the text information. For example, when the whole text information includes ten sentences, each sentence includes two time stamps. That is to say, the whole text information includes twenty time stamps. The twenty time stamps can generate a sequence of data that is time-related. For example, the first sentence includes a first and a second time stamps, the second sentence includes a third and fourth time stamps . . . and the tenth sentence includes nineteenth and twentieth time stamps. If the computing device obtains two candidate paragraph segmentation positions, and one candidate paragraph segmentation position is corresponding an end sentence segmentation position of the second sentence, the other candidate paragraph segmentation position is corresponding an end sentence segmentation position of the eighteenth sentence. Thus, the computing device can acquire the third and the fourth time stamp and the fifteenth and sixteenth time stamp.

It should be noted that an end sentence segmentation position of a previous sentence of the text comes immediately or sequentially before the start sentence segmentation position of a following sentence. For example, an end sentence segmentation position of a first sentence of the text is a start sentence segmentation position of the second sentence. A time stamp of a previous sentence of the text is a time stamp of sentence after the previous sentence. For example, the second time stamp is the third time stamp, and the fourth time stamp is the fifth time stamp, and so on.

The obtaining module 201 obtains several candidate video clips by cutting the video according to the acquired time stamps.

For example, the text information is segmented by the candidate paragraph segmentation positions to obtain a first candidate text segment, a second candidate text segment, and a third candidate text segment. A start time and an end time of the first candidate text segment can be obtained according to the time stamp of the first candidate text segment, and the video is cut according to the start time and end time to obtain the first candidate video clip. In the same way, the second candidate video clip corresponding to the second candidate text segment and the third candidate video clip corresponding to the third candidate text segment can be obtained.

The obtaining module 201 obtains multiple target video clips by filtering the multiple candidate video clips according to preset content.

In at least one embodiment, the multiple candidate video clips can be filtered according to the preset content of the course video. The preset content of the course video can include items of information as knowledge or mentions of particular points of interest ("course knowledge points"). Only video clips whose content matches with the course knowledge points are retained to obtain multiple target video clips.

For example, the video to be cut may contain a lot of content that the target person indicates or states has nothing to do with course knowledge points. After segmenting the video to be cut, the multiple candidate video clips that are not related to the course knowledge points are deleted, and only relevant video clips are retained.

A method for obtaining multiple target video clips by filtering the multiple candidate video clips according to preset content includes: obtaining each candidate text segment corresponding to each candidate video clip; calculating a similarity between the candidate text segment and the preset content; If the similarity is greater than or equal to a preset value, determining that the candidate video clip corresponding to the candidate text segment is a target video clip; if the similarity is less than the preset value, deleting the candidate video clip.

The outputting module 204 outputs the multiple target video clips.

In at least one embodiment, the method further includes: determining quality of each of the multiple target video clips according to several predetermined parameters, and the predetermined parameters include a position of the target person in the images of the multiple target video clips, a period of time during which the target person appears in the multiple target video clips, camera movement or shake, and brightness of the images of the multiple target video clips; obtaining high-quality target video clips according to the quality and outputting the high-quality target video clips. In at least one embodiment, a method for determining quality of each of the multiple target video clips according to predetermined parameters includes:

establishing a classifier mechanism based on the predetermined parameters; filtering out low-quality target video slices among the multiple target video slices through the classifier to obtain high-quality target video clips. It should be noted that the classifier can classify videos into the two categories of high quality and low quality based on the predetermined parameters. The method for establishing the classifier mechanism based on the predetermined parameters is an existing technology, and will not be repeated here.

if a position of the target person of the image of the target video clip is not a center of the image, the quality of the target video clip is confirmed to be high; if his or her position is the center of the image, the quality of the target video clip is deemed to be low. If the time period of the target person appearing in the multiple target video clips is greater than or equal to a predetermined time period, the quality of the target video clip is deemed to be high; if the time period of the target person appearing in the multiple target video clips is less than the predetermined time period, the quality of the target video clip is deemed to be low. If there is no camera shake in the target video clip, the quality of the target video clip is confirmed to be high; if there is camera shake in the target video clip, the quality of the target video clip is confirmed to be low. If the overall brightness of the target video clip is high, the quality of the target video clip is confirmed to be high; if the display brightness of the target video clip is low, the quality of the target video clip is confirmed to be low.

In at least one embodiment, a method for determining the position of the target person of the image of the target video clip includes: detecting feature points of a face of the target person of the image of the target video clip by a key point detection algorithm, and calculating distances between the feature points and edges of the image of the target video clip, and determining the position of the target person in the image based on the distances.

In at least one embodiment, a method for calculating the time period of the target person appearing in the multiple target video clips includes: detecting feature points of a face of the target person of the image of the target video clip by a key point detection algorithm, and recording a time period of the feature points appearing in the multiple target video clip, and setting the time period of the feature points appearing in the multiple target video clip as equal to the time period of the target person himself appearing in the multiple target video clip.

In at least one embodiment, a method for determining whether there is camera shake of the target video clip includes: detecting multiple feature points in a first frame of the target video clip by an image corner fast detection algorithm; recording a plurality of first positions of the plurality of feature points in the first frame; recording a plurality of second positions of the multiple feature points in a second frame of the target video clip; determining whether the plurality of first positions are the same as the plurality of second positions; if a ratio of correspondence between the first position and the second position is greater than or equal to a preset ratio, the camera shake is determined to exist; if the ratio is less, the camera shake is determined to be absent. If positions of the points are tracked, and a large proportion of the points change, this indicates the camera shake.

In at least one embodiment, a method for determining the brightness of images of the target video clip includes: detecting multiple feature points in a first frame of the target video clip by an image corner fast detection algorithm; estimating a face region, a shoulder region, and a background region based on the multiple feature points; average processing of the brightness of the face area, shoulder area, and background area; if the average processed brightness is greater than or equal to a preset brightness, the brightness of the image of the target video clip is determined to be high and acceptable; if the average processed brightness is less than the preset brightness, the brightness of the image of the target video clip is determined to be low and unacceptable.

Figure 3:
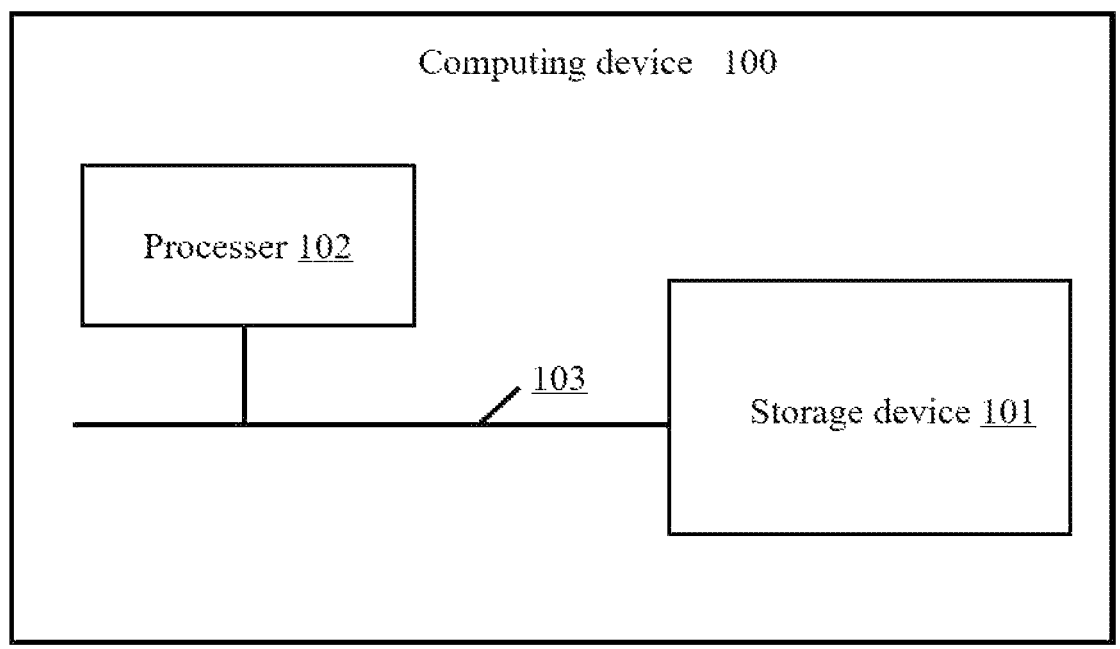
FIG. 3 shows a schematic structural diagram of a computing device applying the method according to the present disclosure.

FIG. 3 shows a schematic structural diagram of a computing device according to an embodiment of the present disclosure.

As shown in FIG. 1, the computing device 100 may include: at least one storage device 101, at least one processor 102, and at least one communication bus 103.

It should be understood by those skilled in the art that the structure of the computing device 100 shown in FIG. 1 does not constitute a limitation of the embodiment of the present disclosure. The computing device 100 may be a bus type structure or a star type structure, and the computing device 100 may also include more or less hardware or software than illustrated, or may have different component arrangements.

In at least one embodiment, the computing device 100 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 100 may further include an electronic device. The electronic device can interact with a user through a keyboard, a mouse, a remote controller, a touch panel or a voice control device, for example, an individual computers, tablets, smartphones, digital cameras, etc.

It should be noted that the computing device 100 is merely an example, and other existing or future electronic products may be included in the scope of the present disclosure, and are included in the reference.

In some embodiments, the storage device 101 can be used to store program codes of computer readable programs and various data, such as the video cutting device 20 installed in the computing device 100, and automatically access to the programs or data with high speed during running of the computing device 100. The storage device 101 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 100 that can be used to carry or store data.

In some embodiments, the at least one processor 102 may be composed of an integrated circuit, for example, may be composed of a single packaged integrated circuit, or may be composed of a plurality of integrated circuits of same function or different functions. The at least one processor 102 can include one or more central processing units (CPU), a microprocessor, a digital processing chip, a graphics processor, and various control chips. The at least one processor 102 is a control unit of the computing device 100, which connects various components of the computing device 100 using various interfaces and lines. By running or executing a computer program or modules stored in the storage device 101, and by invoking the data stored in the storage device 101, the at least one processor 102 can perform various functions of the computing device 100 and process data of the computing device 100.

In some embodiments, the least one bus 103 is used to achieve communication between the storage device 101 and the at least one processor 102, and other components of the compute device 100.

Although it is not shown, the computing device 100 may further include a power supply (such as a battery) for powering various components. In some embodiments, the power supply may be logically connected to the at least one processor 102 through a power management device, thereby, the power management device manages functions such as charging, discharging, and power management. The power supply may include one or more a DC or AC power source, a recharging device, a power failure detection circuit, a power converter or inverter, a power status indicator, and the like. The computing device 100 may further include various sensors, such as a BLUETOOTH module, a Wi-Fi module, and the like, and details are not described herein.

It should be understood that the described embodiments are for illustrative purposes only and are not limited by the scope of the present disclosure.

The above-described integrated unit implemented in a form of software function modules can be stored in a computer readable storage medium. The above software function modules are stored in a storage medium, and includes a plurality of instructions for causing a computing device (which may be a personal computer, or a network device, etc.) or a processor to execute the method according to various embodiments of the present disclosure.

In a further embodiment, in conjunction with FIG. 1, the at least one processor 102 can execute an operating device and various types of applications (such as the video cutting device 20) installed in the computing device 100, program codes, and the like. For example, the at least one processor 102 can execute the modules 201-204.

In at least one embodiment, the storage device 101 stores program codes. The at least one processor 102 can invoke the program codes stored in the storage device 101 to perform related functions. For example, the modules described in FIG. 2 are program codes stored in the storage device 101 and executed by the at least one processor 102, to implement the functions of the various modules.

In at least one embodiment, the storage device 101 stores a plurality of instructions that are executed by the at least one processor 102 to implement all or part of the steps of the method described in the embodiments of the present disclosure.

Specifically, the storage device 101 stores the plurality of instructions which when executed by the at least one processor 102, causes the at least one processor 102 to: obtain a video to be cut; extract text information corresponding to the video to be cut; obtain a plurality of candidate paragraph segmentation positions by analyzing the text information through a semantic segmentation model; obtain a plurality of candidate text segments by segmenting the text information according to the candidate paragraph segmentation positions; acquire a plurality of time stamps of the plurality of candidate text segments; obtain a plurality of candidate video clips by cutting the video according to the acquired time stamps; obtain a plurality of target video clips by filtering the plurality of candidate video clips according to preset content; and output the plurality of target video clips.

The embodiment of the present disclosure further provides a computer storage medium, and the computer storage medium store a program that performs all or part of the steps including any of the method described in the above embodiments.

A non-transitory storage medium having stored thereon instructions that, when executed by a processor of a computing device, causes the computing device to perform a method for cutting video, the method including: obtaining a video to be cut; extracting text information corresponding to the video to be cut; obtaining a plurality of candidate paragraph segmentation positions by analyzing the text information through a semantic segmentation model; obtaining a plurality of candidate text segments by segmenting the text information according to the candidate paragraph segmentation positions; acquiring a plurality of time stamps of the plurality of candidate text segments; obtaining a plurality of candidate video clips by cutting the video according to the acquired time stamps; obtaining a plurality of target video clips by filtering the plurality of candidate video clips according to preset content; and outputting the plurality of target video clips.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly, those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

In several embodiments provided in the preset application, it should be understood that the disclosed apparatus can be implemented in other ways. For example, the device embodiments described above are merely illustrative. For example, divisions of the unit are only a logical function division, and there can be other division ways in actual implementation.

The modules described as separate components may or may not be physically separated, and the components displayed as modules may or may not be physical units. That is, it can locate in one place, or distribute to a plurality of network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any reference signs in the claims should not be construed as limiting the claim.

The above embodiments are only used to illustrate technical solutions of the present disclosure, and are not restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the technical solutions or from the scope of the technical solutions of the embodiments of the present disclosure.

What is claimed is:

1. A method for cutting video applicable in a computing device, the method comprising:
    obtaining a video to be cut;
    extracting text information corresponding to the video to be cut;
    obtaining a plurality of candidate paragraph segmentation positions by analyzing the text information through a semantic segmentation model, which comprises a local semantic segmentation model, and obtaining each candidate paragraph segmentation position by analyzing the text information through the local semantic segmentation model comprising: encoding a context of each sentence segmentation position of the text information through an embedding layer of the local semantic segmentation model; performing feature extraction on the encoded text information through a pre-trained language model; classifying each sentence segmentation position according to the extracted features by a classifier; calculating a first probability of each sentence segmentation position; and in response that the first probability is greater than or equal to a preset probability, determining the sentence segmentation position to be a candidate paragraph segmentation position;
    obtaining a plurality of candidate text segments by segmenting the text information according to the candidate paragraph segmentation positions;
    acquiring a plurality of time stamps of the plurality of candidate text segments;
    obtaining a plurality of candidate video clips by cutting the video according to the acquired time stamps;
    obtaining a plurality of target video clips by filtering the plurality of candidate video clips according to preset content; and
    outputting the plurality of target video clips.

2. The method of claim 1, wherein the method of extracting text information corresponding to the video to be cut comprises:
    acquiring audio information of the video to be cut;
    extracting subtitles corresponding to the audio information by speech-to-text technology; and
    generating the text information according to the subtitles.

3. The method of claim 1, wherein the text information is a complete text without paragraph segmentation, and the text information comprises a plurality of sentence segmentation positions and time stamps.

4. The method of claim 3, wherein the semantic segmentation model further comprises a global semantic segmentation model.

5. The method of claim 4, wherein a method for obtaining the candidate paragraph segmentation positions by analyzing the text information through the global semantic segmentation model comprises:
    dividing the text information into a first text block sequence and a second text block sequence;
    encoding a context of each sentence segmentation position of the first text block sequence and the second text block sequence through an embedding layer of the global semantic segmentation model;
    obtaining a first feature by performing feature extraction on the encoded first text block sequence through the pre-trained language model, and obtaining a second feature by performing feature extraction on the encoded second text block sequence through the pre-trained language model;

classifying each sentence segmentation position according to the extracted first feature and the second feature by the classifier, and calculating a second probability of each sentence segmentation position; and in response that the second probability is greater than or equal to a second preset probability, determining that the sentence segmentation position is a candidate paragraph segmentation position.

6. The method of claim 1, wherein a method for obtaining a plurality of target video clips by filtering the plurality of candidate video clips according to preset content comprises:

obtaining each candidate text segment corresponding to each candidate video clip;

calculating a similarity between the candidate text segment and the preset content;

in response that the similarity is greater than or equal to a preset value, determining that the candidate video clip corresponding to the candidate text segment is the target video clip; and in response that the similarity is less than the preset value, deleting the candidate video clip corresponding to the candidate text segment.

7. The method of claim 1, further comprising:

determining quality of each of the plurality of target video clips according to predetermined parameters, and the predetermined parameters comprises a position of the target person in the images of the multiple target video clips, a time period of the target person appears in the multiple target video clips, camera shake, and brightness of the images of the multiple target video clips; and obtaining high-quality target video clips according to the quality and outputting the high-quality target video clips.

8. A computing device, comprising:

at least one processor; and a storage device storing one or more programs which when executed by the at least one processor, causes the at least one processor to:

obtain a video to be cut;

extract text information corresponding to the video to be cut;

obtain a plurality of candidate paragraph segmentation positions by analyzing the text information through a semantic segmentation model, which comprises a local semantic segmentation model, the candidate paragraph segmentation positions being obtained by: encoding a context of each sentence segmentation position of the text information through an embedding layer of the local semantic segmentation model; performing feature extraction on the encoded text information through a pre-trained language model; classifying each sentence segmentation position according to the extracted features by a classifier; calculating a first probability of each sentence segmentation position; and in response that the first probability is greater than or equal to a preset probability, determining the sentence segmentation position to be a candidate paragraph segmentation position;

obtain a plurality of candidate text segments by segmenting the text information according to the candidate paragraph segmentation positions;

acquire a plurality of time stamps of the plurality of candidate text segments;

obtain a plurality of candidate video clips by cutting the video according to the acquired time stamps;

obtain a plurality of target video clips by filtering the plurality of candidate video clips according to preset content; and output the plurality of target video clips.

9. The computing device of claim 8, wherein a method for extracting text information corresponding to the video to be cut comprises:

acquiring audio information of the video to be cut;

extracting subtitles corresponding to the audio information by speech-to-text technology; and generating the text information according to the subtitles.

10. The computing device of claim 8, wherein the text information is a complete text without paragraph segmentation, and the text information comprises a plurality of sentence segmentation positions and time stamps.

11. The computing device of claim 10, wherein the semantic segmentation model further comprises a global semantic segmentation model.

12. The computing device of claim 11, wherein a method for obtaining the candidate paragraph segmentation positions by analyzing the text information through the global semantic segmentation model comprises:

dividing the text information into a first text block sequence and a second text block sequence;

encoding a context of each sentence segmentation position of the first text block sequence and the second text block sequence through an embedding layer of the global semantic segmentation model;

obtaining a first feature by performing feature extraction on the encoded first text block sequence through the pre-trained language model, and obtaining a second feature by performing feature extraction on the encoded second text block sequence through the pre-trained language model;

classifying each sentence segmentation position according to the extracted first feature and the second feature by the classifier, and calculating a second probability of each sentence segmentation position; and in response that the second probability is greater than or equal to a second preset probability, determining that the sentence segmentation position is a candidate paragraph segmentation position.

13. The computing device of claim 12, the at least one processor further to:

determine quality of each of the plurality of target video clips according to predetermined parameters, and the predetermined parameters comprises a position of the target person in the images of the multiple target video clips, a time period of the target person appears in the multiple target video clips, camera shake, and brightness of the images of the multiple target video clips; and obtain high-quality target video clips according to the quality and outputting the high-quality target video clips.

14. The computing device of claim 8, wherein a method for obtaining a plurality of target video clips by filtering the plurality of candidate video clips according to preset content comprises:

obtaining each candidate text segment corresponding to each candidate video clip;

calculating a similarity between the candidate text segment and the preset content;

in response that the similarity is greater than or equal to a preset value, determining that the candidate video clip corresponding to the candidate text segment is the target video clip; and in response that the similarity is less than the preset value, deleting the candidate video clip corresponding to the candidate text segment.

15. A non-transitory storage medium having stored thereon instructions that, when executed by a processor of a computing device, causes the computing device to perform a method for cutting video, the method comprising:

obtaining a video to be cut;

extracting text information corresponding to the video to be cut;

obtaining a plurality of candidate paragraph segmentation positions by analyzing the text information through a semantic segmentation model, which comprises a local semantic segmentation model, and obtaining each candidate paragraph segmentation position by analyzing the text information through the local semantic segmentation model comprising: encoding a context of each sentence segmentation position of the text information through an embedding layer of the local semantic segmentation model; performing feature extraction on the encoded text information through a pre-trained language model; classifying each sentence segmentation position according to the extracted features by a classifier; calculating a first probability of each sentence segmentation position; and in response that the first probability is greater than or equal to a preset probability, determining the sentence segmentation position to be a candidate paragraph segmentation position;

obtaining a plurality of candidate text segments by segmenting the text information according to the candidate paragraph segmentation positions;

acquiring a plurality of time stamps of the plurality of candidate text segments;

obtaining a plurality of candidate video clips by cutting the video according to the acquired time stamps;

obtaining a plurality of target video clips by filtering the plurality of candidate video clips according to preset content; and outputting the plurality of target video clips.

16. The non-transitory storage medium of claim 15, wherein the method of extracting text information corresponding to the video to be cut comprises:

acquiring audio information of the video to be cut;

extracting subtitles corresponding to the audio information by speech-to-text technology; and generating the text information according to the subtitles.

17. The non-transitory storage medium of claim 15, wherein the text information is a complete text without paragraph segmentation, and the text information comprises a plurality of sentence segmentation positions and time stamps.

18. The non-transitory storage medium of claim 17, wherein the semantic segmentation model further comprises a global semantic segmentation model.

19. The non-transitory storage medium of claim 18, wherein a method for obtaining the candidate paragraph segmentation positions by analyzing the text information through the global semantic segmentation model comprises:

dividing the text information into a first text block sequence and a second text block sequence;

encoding a context of each sentence segmentation position of the first text block sequence and the second text block sequence through an embedding layer of the global semantic segmentation model;

obtaining a first feature by performing feature extraction on the encoded first text block sequence through the pre-trained language model, and obtaining a second feature by performing feature extraction on the encoded second text block sequence through the pre-trained language model;

classifying each sentence segmentation position according to the extracted first feature and the second feature by the classifier, and calculating a second probability of each sentence segmentation position; and in response that the second probability is greater than or equal to a second preset probability, determining that the sentence segmentation position is a candidate paragraph segmentation position.

20. The non-transitory storage medium of claim 15, wherein a method for obtaining a plurality of target video clips by filtering the plurality of candidate video clips according to preset content comprises:

obtaining each candidate text segment corresponding to each candidate video clip;

calculating a similarity between the candidate text segment and the preset content;

in response that the similarity is greater than or equal to a preset value, determining that the candidate video clip corresponding to the candidate text segment is the target video clip; and in response that the similarity is less than the preset value, deleting the candidate video clip corresponding to the candidate text segment.

* * * * *